United States Patent
Mandel

(10) Patent No.: US 9,681,639 B2
(45) Date of Patent: Jun. 20, 2017

(54) TOILET DEVICE FOR CATS

(71) Applicant: Rachelle Mandel, Boca Raton, FL (US)

(72) Inventor: Rachelle Mandel, Boca Raton, FL (US)

(*) Notice: Subject to any disclaimer, the term of this patent is extended or adjusted under 35 U.S.C. 154(b) by 0 days.

(21) Appl. No.: 14/553,361

(22) Filed: Nov. 25, 2014

(65) Prior Publication Data

US 2015/0144066 A1 May 28, 2015

Related U.S. Application Data

(60) Provisional application No. 61/909,126, filed on Nov. 26, 2013.

(51) Int. Cl.
*A01K 1/01* (2006.01)

(52) U.S. Cl.
CPC .......... *A01K 1/0121* (2013.01); *A01K 1/0107* (2013.01)

(58) Field of Classification Search
CPC .. A01K 1/0107; A01K 1/0121; A01K 1/0088; A01K 1/02; A01K 1/03
See application file for complete search history.

(56) References Cited

U.S. PATENT DOCUMENTS

| | | | |
|---|---|---|---|
| 3,890,931 A * | 6/1975 | Saver | A01K 1/0107 119/161 |
| 3,921,582 A | 11/1975 | Sedlmeir | |
| 4,271,544 A * | 6/1981 | Hammond | A01K 1/0121 119/162 |
| 6,453,844 B1 | 9/2002 | Janzen et al. | |
| 6,860,231 B1 | 3/2005 | Rus | |
| 7,963,251 B2 | 6/2011 | Lapidge et al. | |
| 2012/0012063 A1 | 1/2012 | Smith et al. | |
| 2013/0220230 A1* | 8/2013 | Hazer | A01K 1/033 119/436 |

FOREIGN PATENT DOCUMENTS

WO    WO 0000018    1/2000

* cited by examiner

*Primary Examiner* — Monica Williams
*Assistant Examiner* — Jessica Wong
(74) *Attorney, Agent, or Firm* — Robert M. Downey, P.A.

(57) ABSTRACT

A feces and urine disposal device for cats includes a support structure having parallel, vertically extending wall members, a bottom chamber, and an elevated relief area between the opposing wall members and above the bottom chamber. The relief area includes a pair of longitudinal channels disposed in spaced, parallel relation to one another and an open longitudinal gap between the channels and communicating with the bottom chamber. In use, a cat stands in the relief area with the left paws in one channel and the right paws in the opposite channel so that the cat is straddling the gap. When the cat relieves itself, feces and urine pass through the gap and into a removable trough positioned in the bottom chamber or directly into a toilet bowl. Cat litter or another odor absorbing or containing substance can be placed in the trough, as well as the relief area.

15 Claims, 9 Drawing Sheets

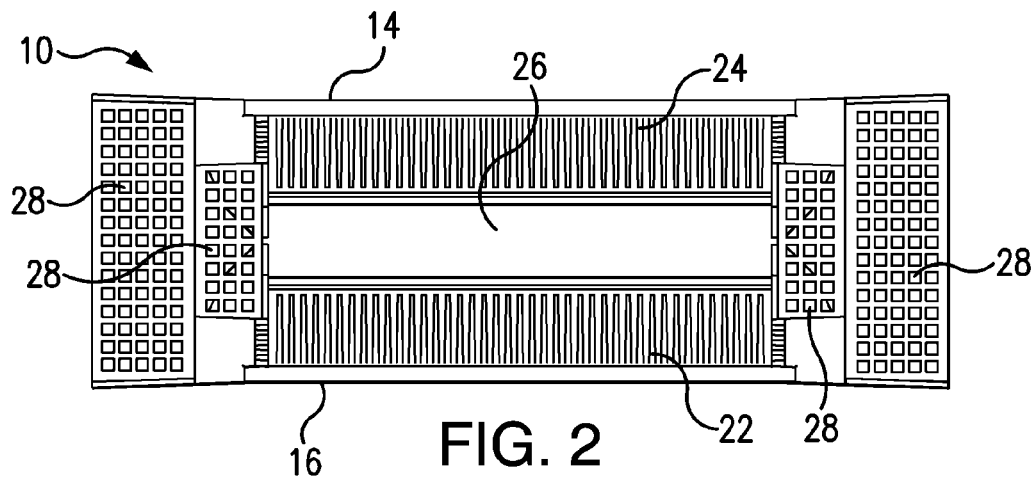
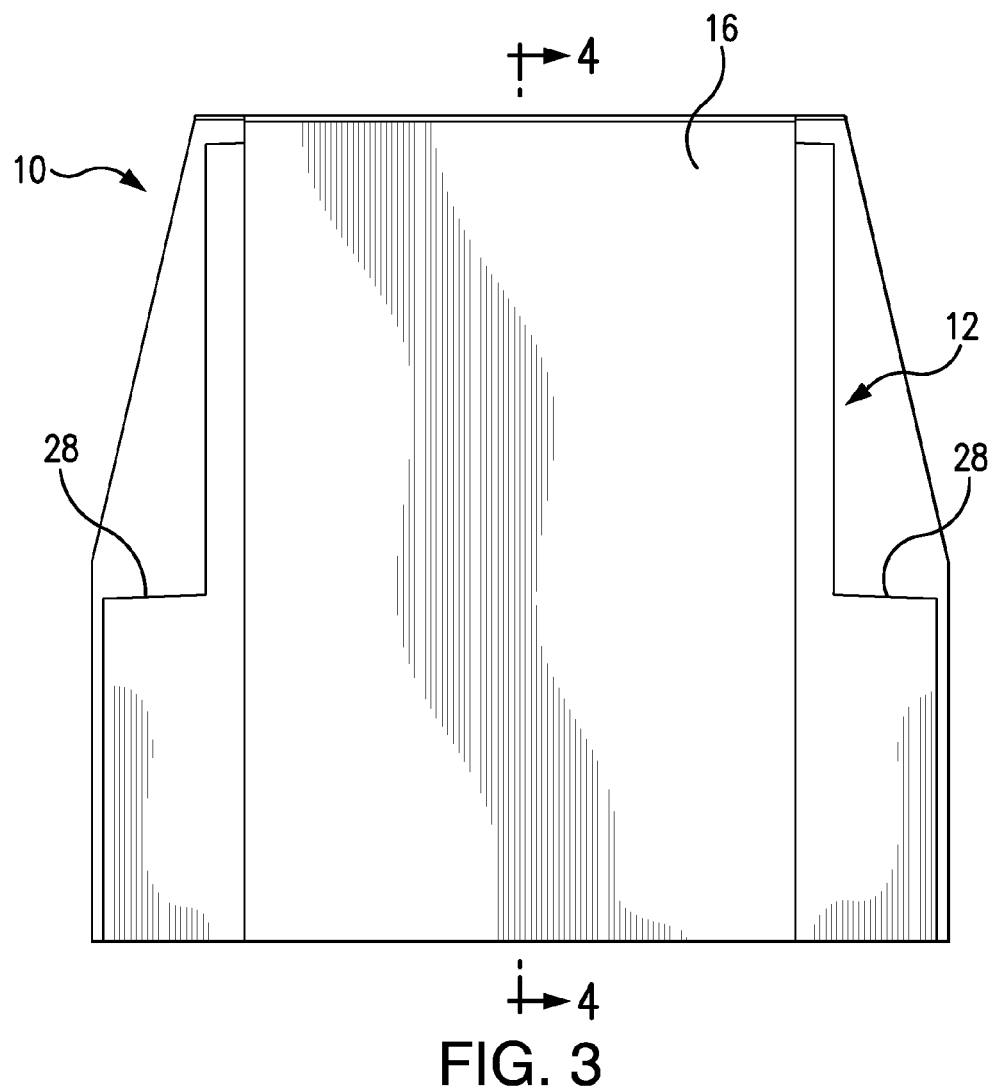

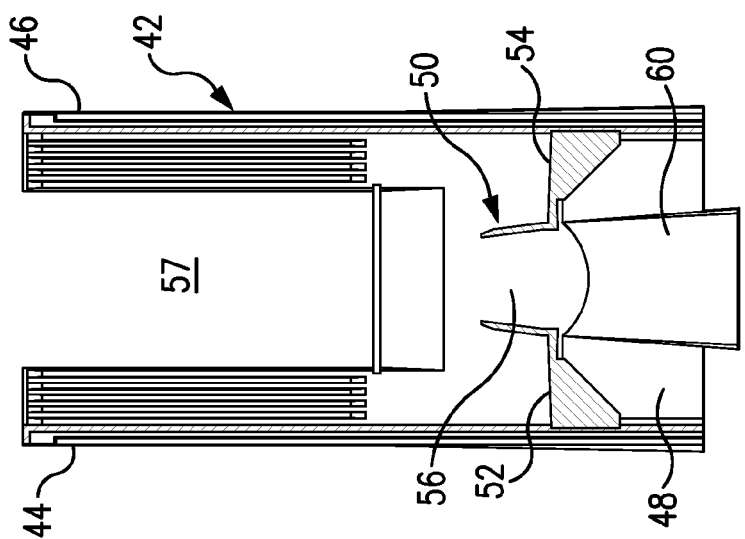
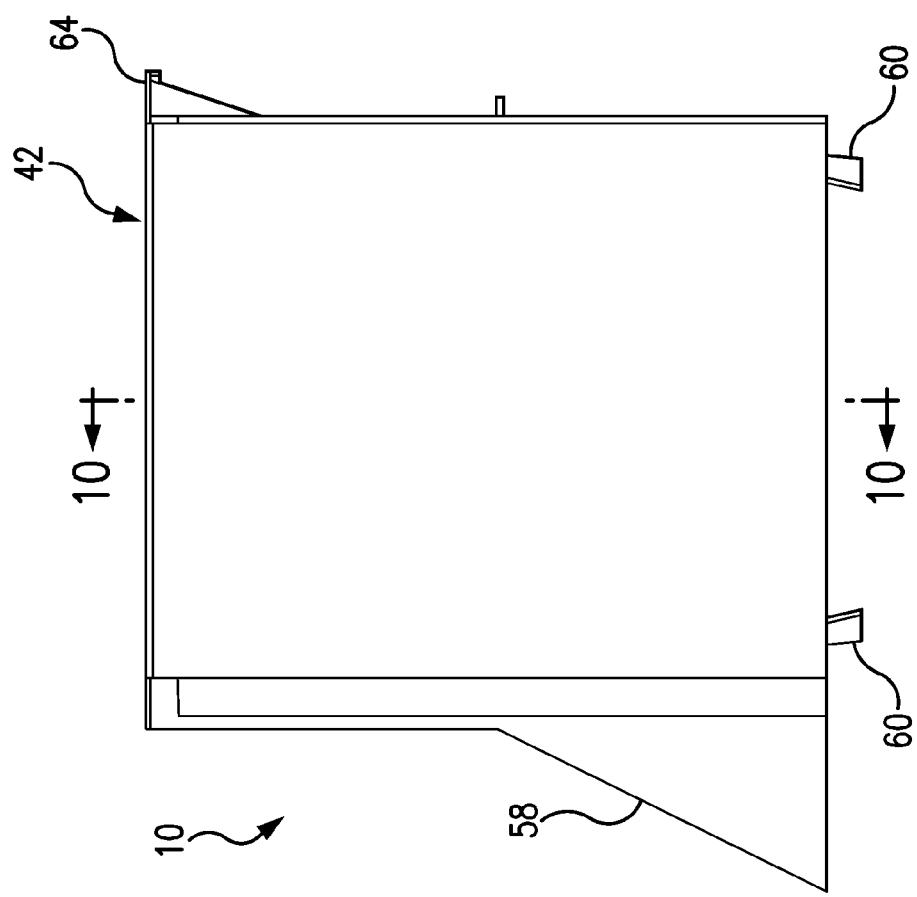

TOILET DEVICE FOR CATS

BACKGROUND OF THE INVENTION

This patent application is based on provisional patent application Ser. No. 61/909,126 filed on Nov. 26, 2013.

FIELD OF THE INVENTION

The present invention relates to cat boxes for containing urine and feces and, more particularly, to a toilet device for cats that allows cats to relieve themselves without coming into any direct contact with their feces and urine.

DISCUSSION OF THE RELATED ART

In outdoor environments, cats instinctively know to excrete feces and urine after having dug a hole in soft or sandy soil, using their paws in a backward sweeping motion. However, since many cat owners prefer to maintain their pets indoors for health and security reasons, litter boxes are extremely popular and used by most cat owners. There are many different types of litter boxes on the market, from the basic shallow tray to more elaborate enclosed structures that can include all types of features, including electrically powered rakes and other self-cleaning mechanisms that help to separate fecal matter and clumps of urine saturated litter from the remainder of the cat litter in the primary relief area of the litter box. Regardless of the various styles and numerous features on cat litter boxes, they all have the same primary drawbacks. Specifically, all cat litter boxes on the market suffer from the problems of fecal matter and urine contacting and clinging to the paws and hairs of the cat, continuous foul odors and a significant portion of litter granules being kicked out of the litter box by the cat when attempting to bury its feces and urine after relieving itself. Because litter boxes actually require cats to stand in the litter where they relieve themselves, it is inevitable that fecal matter and urine will come in direct contact with the cat's paws and, in many cases, will cling to the paws and hair even after the cat has exited the litter box. This fecal matter and urine can then be deposited on floors, carpets, furniture, bedding and countertops. This presents a health hazard to occupants of a household, particularly pregnant women and others who may have a compromised immune system.

A further drawback of litter boxes is the need to regularly purchase large volumes of cat litter which can be expensive and heavy to transport from the store to one's home.

Accordingly, there is a need for a feces and urine disposal device for cats that allows cats to relieve themselves without coming into any direct contact with their feces and urine. Moreover, there is a need for a toilet device for cats that is clean, hygienic and for the most part, odorless. There is a further need for a toilet device for cats that is easy to clean and allows for the option of disposing of cat feces and urine in a conventional bathroom toilet. Additionally, there is a need for a toilet device for cats that uses a reduced amount of purchased cat litter. Also, there is a need for a toilet device for cats which reduces the amount of litter granules being kicked out of the litter box.

SUMMARY OF THE INVENTION

The present invention provides for a clean, odorless and hygienic toilet device for cats that allows cats to relieve themselves without directly contacting their feces and urine. More particularly, a feces and urine disposal device for cats includes a support structure having parallel, vertically extending wall members, a bottom chamber, and an elevated relief structure between the opposing wall members and above the bottom chamber. The relief structure includes a pair of longitudinal channels disposed in spaced, parallel relation to one another and an open longitudinal gap between the channels and communicating with the bottom chamber. In use, a cat stands on the relief structure with the left paws in one channel and the right paws in the opposite channel so that the cat is straddling the gap. When the cat relieves itself, feces and urine pass through the gap and into a removable receptacle (i.e., an elongate trough) that is positioned in the bottom chamber. The receptacle may be filled at least partially with cat litter, sand or saw dust, or, alternatively, with water. When water is used in the receptacle, a few drops of oil can be placed on the top surface of the water which helps to prevent release of odors from the feces and urine from below the water surface.

BRIEF DESCRIPTION OF THE DRAWINGS

For a fuller understanding of the nature of the present invention, reference should be made to the following detailed description taken in conjunction with the accompanying drawings in which:

FIG. 2 is a top plan view of the cat toilet device showing an important feature of the invention consisting of a pair of parallel channels and a longitudinal gap between the parallel channels, wherein a cat, when relieving itself, straddles the gap so that the feces and urine pass through the gap and down into the receptacle or trough in the bottom chamber of the device;

FIG. 3 is a side elevational view of the cat toilet device of the present invention;

FIG. 9 is a side elevational view of the cat toilet device of the present invention according to the embodiment shown in FIG. 7;

FIG. 10 is a cross-sectional view taken along the lines 10-10 of FIG. 9 illustrating the structure of the relief area comprising the spaced, parallel channels and longitudinal gap between the channels.

Like reference numerals refer to like parts throughout the several views of the drawings.

DETAILED DESCRIPTION OF THE PREFERRED EMBODIMENT

Figure 1:
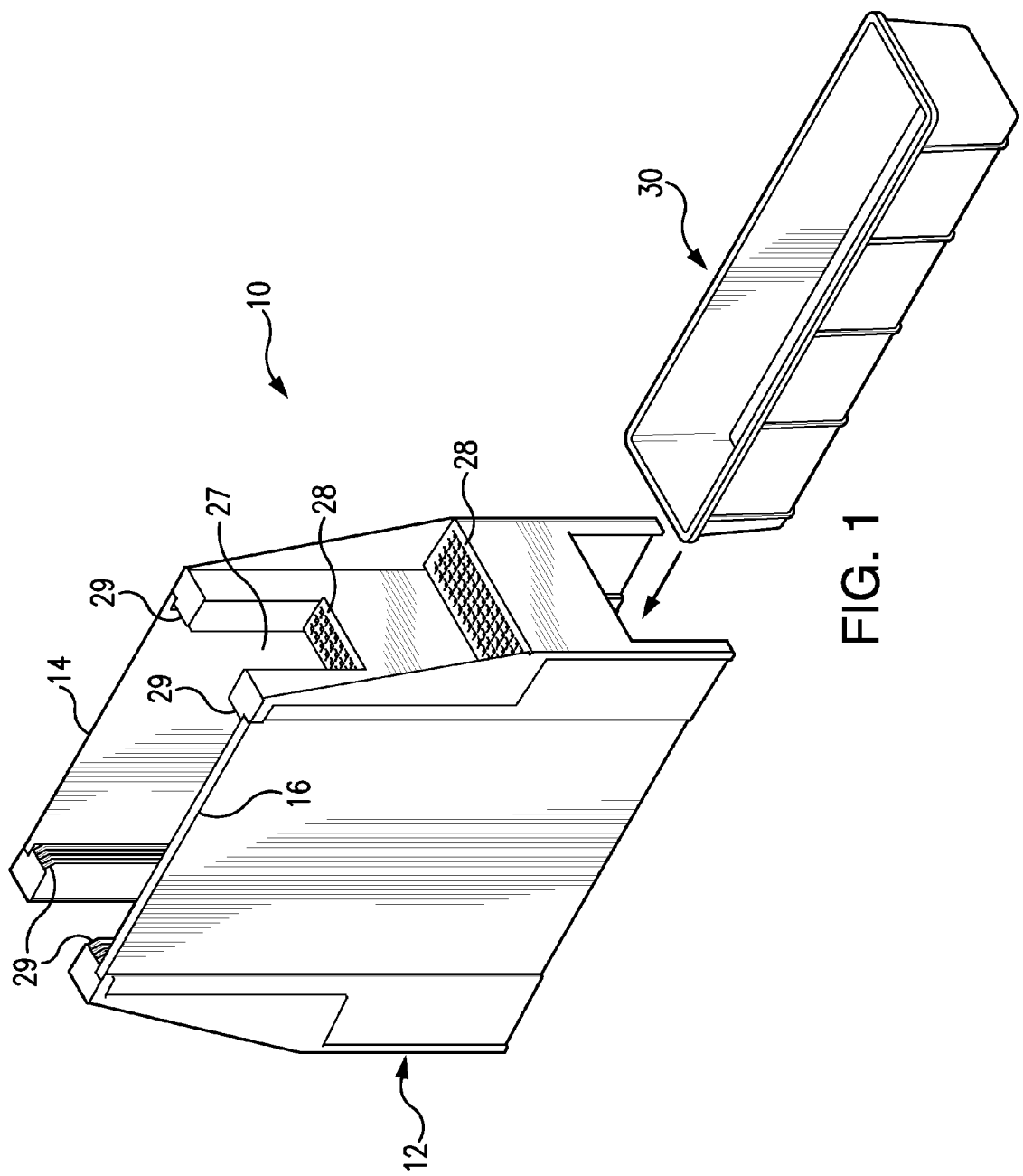
FIG. 1 is a perspective view of the cat toilet device of the present invention, including a removable receptacle or trough that is positioned in a bottom chamber of the device.
Figure 4:
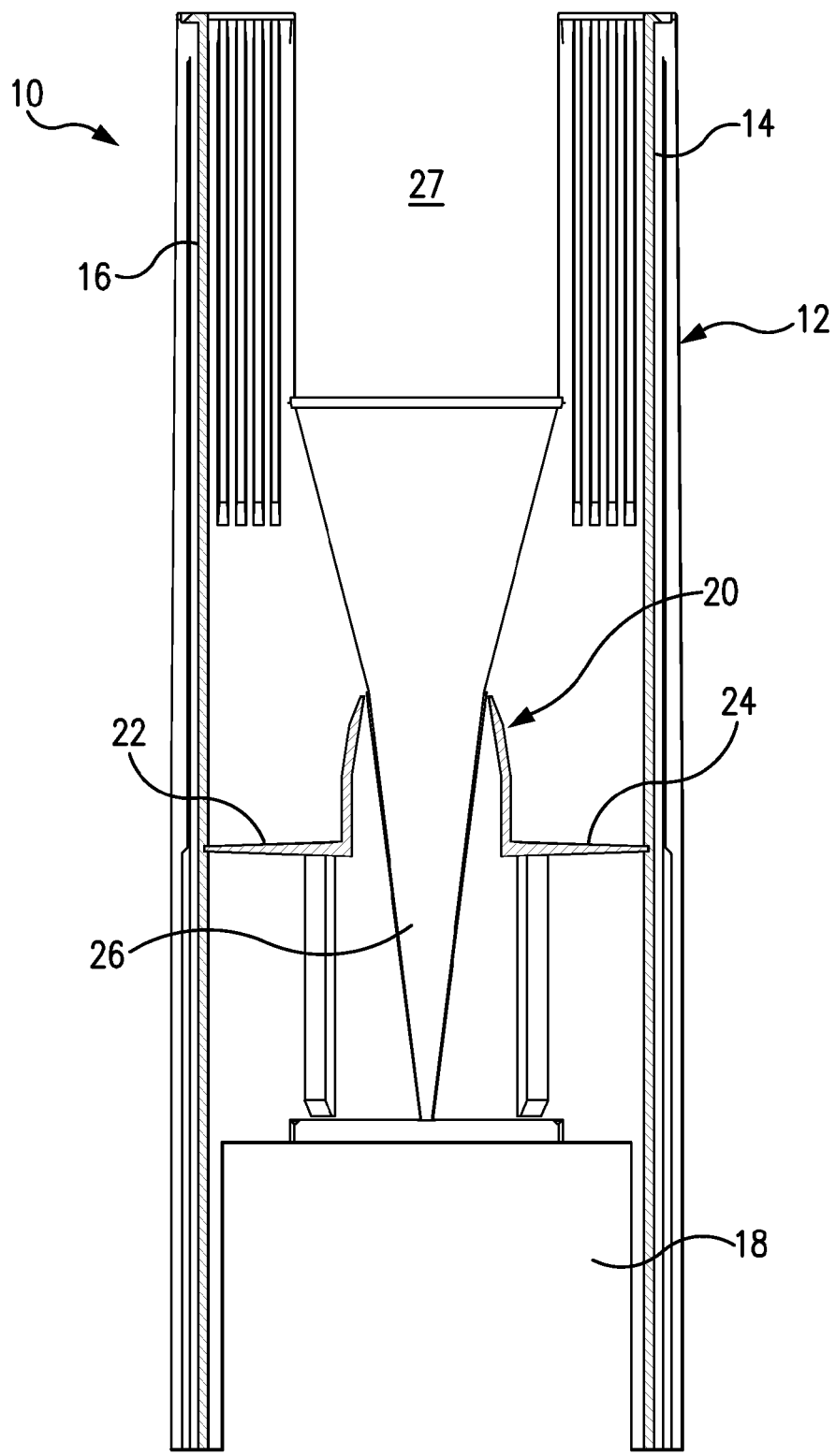
FIG. 4 is a cross-sectional view taken along the lines 4-4 of FIG. 3 illustrating the structure of the relief area comprising the spaced, parallel channels and longitudinal gap between the channels.

Referring to the several views of the drawings, the feces and urine disposal device for cats (hereinafter "cat toilet device") of the present invention is shown and generally indicated as 10.

Referring initially to FIGS. 1-4, a first embodiment of the cat toilet device 10 includes a support structure 12 having parallel, vertically extending wall members 14, 16, a bottom chamber 18, and an elevated relief structure 20 between the opposing wall members 14, 16 and above the bottom chamber 18. The relief structure 20 includes a pair of longitudinal channels 22, 24 disposed in spaced, parallel relation to one another and an open longitudinal gap 26 between the channels 22, 24 and communicating with the bottom chamber 18. One or more steps 28 are provided for allowing a cat to climb the support structure 12 and pass through an entry 27 between the wall members 14, 16 in order to reach the relief structure 20. Slots 29 are provided at the entry for insertion of one or more shims 70 (FIG. 11) in order to narrow the space between the wall members as part of the training process, as described further herein.

In use, a cat stands on the relief structure 20 with the left paws in one channel and the right paws in the opposite channel so that the cat is straddling the gap 26. When the cat relieves itself, feces and urine pass through the gap 26 and into a removable trough 30 that is positioned in the bottom chamber 18 and directly below the gap 26. The trough 30 may be filled at least partially with any kind of cat litter, sand, or saw dust. Alternatively, the trough 30 may be partially filled with water. When water is used, a few drops of oil can be placed on the top surface of the water to create a barrier that helps to prevent release of odors of the feces and urine from below the surface of the water.

Figure 5A:
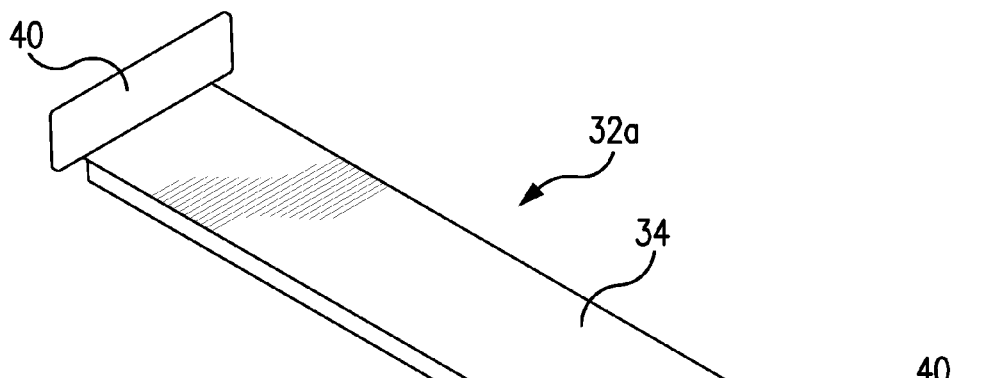
FIGS. 5A-5C show various size training inserts for use in combination with the cat toilet device of the present invention.
Figure 5B:
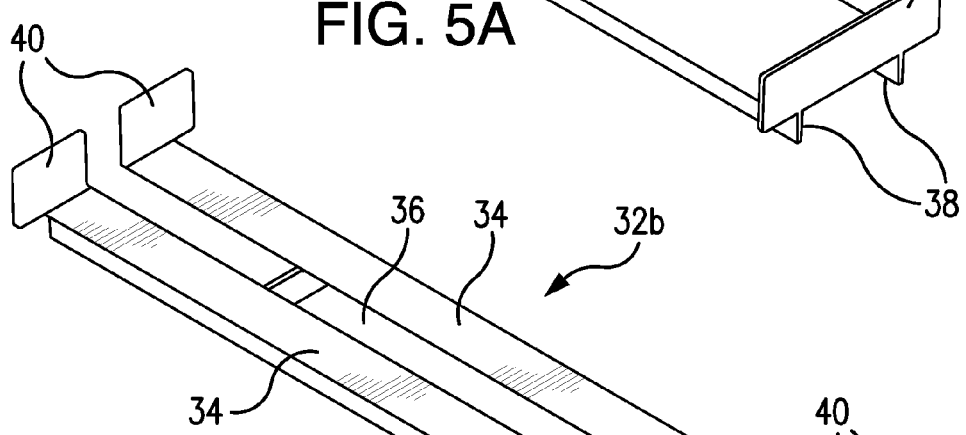
Figure 5C:
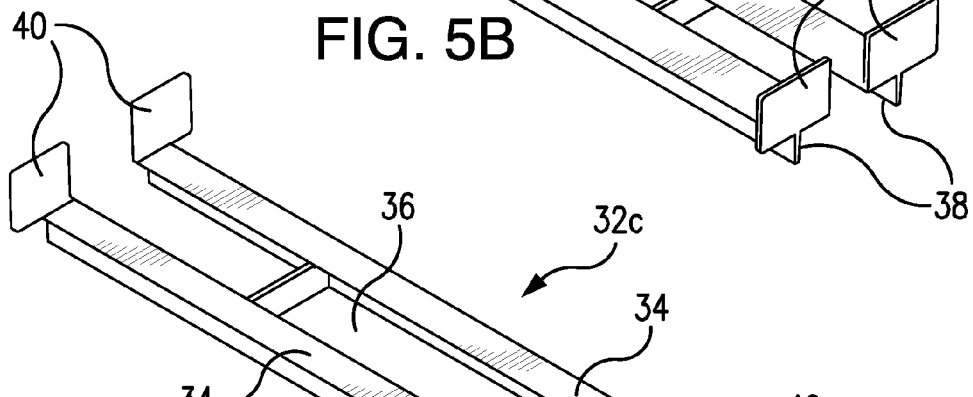
Figure 6:
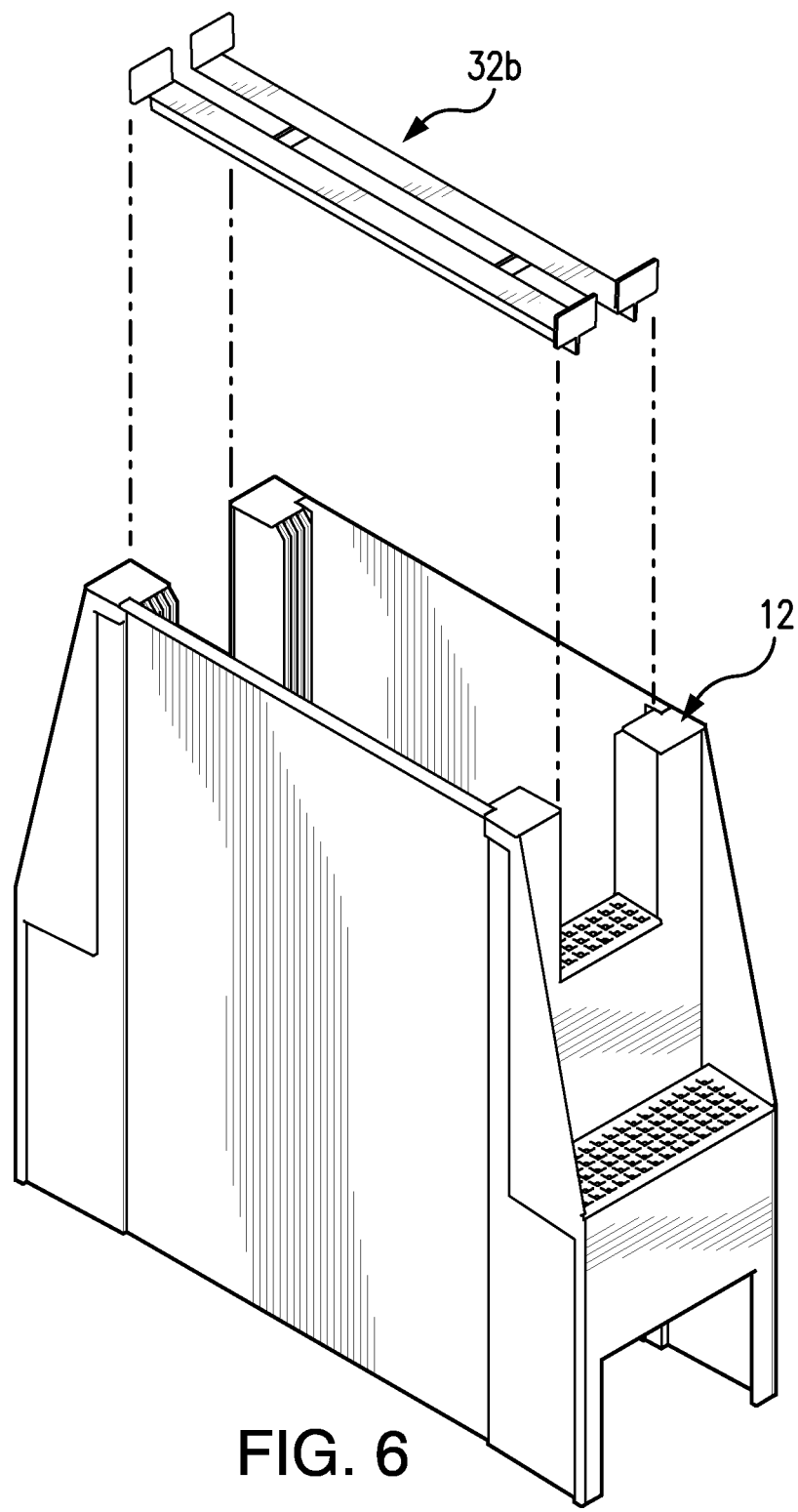
FIG. 6 is a perspective view showing the method of insertion of the training inserts into the cat toilet device of the present invention.

Referring to FIGS. 5A-6, the cat toilet device 10 may include various size training inserts 32a, 32b and 32c for gradually training the cat to utilize the device 10 as described above, wherein the feces and urine pass through the gap 26. As shown in FIG. 5A, one embodiment of the training insert 32a includes a platform 34 that extends the width of the insert 32a. This embodiment of the training insert 32a is ideally used when first introducing a cat to the device 10, wherein the insert 32a has the completely closed platform 34 that can be covered with cat litter or other substance so that the device 10 most closely mimics a traditional litter box. FIGS. 5B and 5C show additional embodiments of the training insert 32b and 32c each including a gap 36 extending the length of the platform 34, and wherein the gap 36 in insert 32c is wider than the gap 36 in the insert 32b. When training a cat to use the cat toilet device 10, training inserts 32a-32c are progressively replaced on the device 10 so the cat can gradually transition into using the cat toilet device 10 without a training insert. Cat litter, sand, saw dust or another granular substance would normally be filled in the longitudinal channels 22, 24 for the cat to stand in while relieving itself. Eventually, some cats may become completely acclimated to use of the device at which point use of cat litter, saw dust, etc. in the channels 22, 24 may no longer be necessary. The top surfaces of the steps 28 contain a number of square cut-out notches to assist with removal of cat litter, saw dust, etc. when the cat exits the relief structure 20.

Each training insert 32a-32c includes oppositely disposed lips 38 sized and configured to engage the longitudinal gap 26 between the channels 22, 24 of the relief structure 20 so that the training insert remains in place during use. As shown in FIG. 6, the training insert 32a, 32b or 32c is lowered between vertically extending wall members 14, 16 and placed against the relief structure 20. Oppositely disposed tabs 40 on each of the embodiments of the training inserts 32a-32c, allow the amount of litter being filled on top of the training insert 32a, 32b or 32c to cover the training strips, which allows the device 10 to most closely mimic a traditional litter box, therefore aiding the training process.

Referring to FIGS. 7-10, a second embodiment of the cat toilet device 10 is shown and is provided for use in combination with a standard bathroom toilet. This embodiment of the cat toilet device 10 includes a support structure 42 having parallel, vertically extending wall members 44, 46, a bottom chamber 48, and an elevated relief structure 50 between the opposing wall members 44, 46 and above the bottom chamber 48. The relief structure 50 includes a pair of longitudinal channels 52, 54 disposed in spaced, parallel relation to one another and an open longitudinal gap 56 between the channels 52, 54 and communicating with the bottom chamber 48. The channels 52 and 54 are intended be filled at least partially with a commercially available flushable cat litter. One or more stairs 58 are provided for climbing the support structure 12 to reach the relief structure 20. Oppositely disposed toilet bowl engaging members 60 are in communication with the relief structure 50 and are provided for frictionally engaging the inner sides of a toilet bowl rim in order to support the cat toilet device 10 on the bathroom toilet. An entry 57 is provided at one end of the support structure 42. A window 62 is provided at the opposite end to permit additional head room (between the device 10 and the toilet bowl tank) for longer cats while relieving themselves. A step 64 is positioned above the window 62 for the cat to step onto after relieving itself in order to exit the device 10 and subsequently step onto the toilet bowl tank or other structure.

Figure 7:
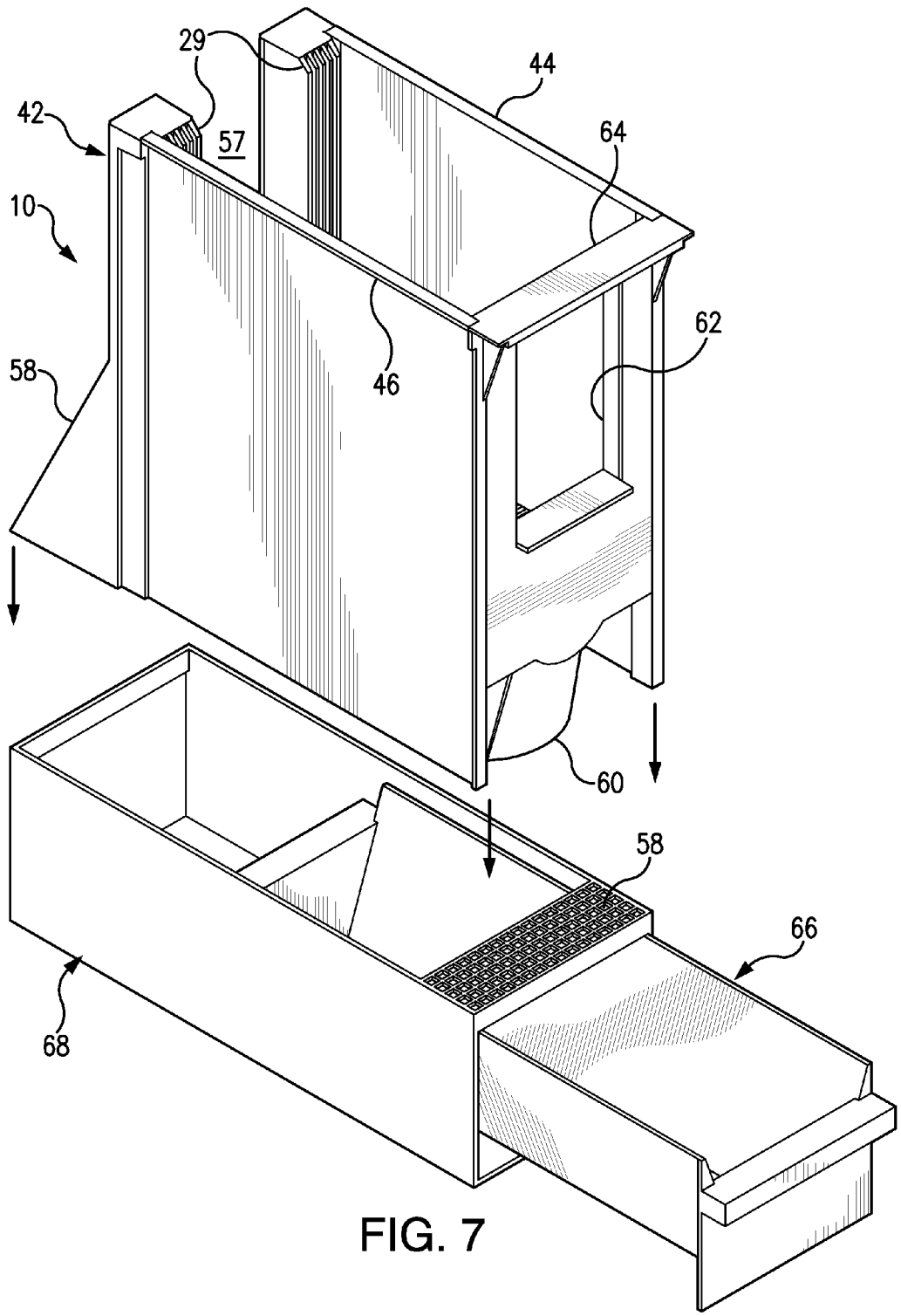
FIG. 7 is a perspective view of the cat toilet device of the present invention according to one embodiment that can be used in conjunction with a bathroom toilet or, alternatively, on a base support that sits on the floor.
Figure 8:
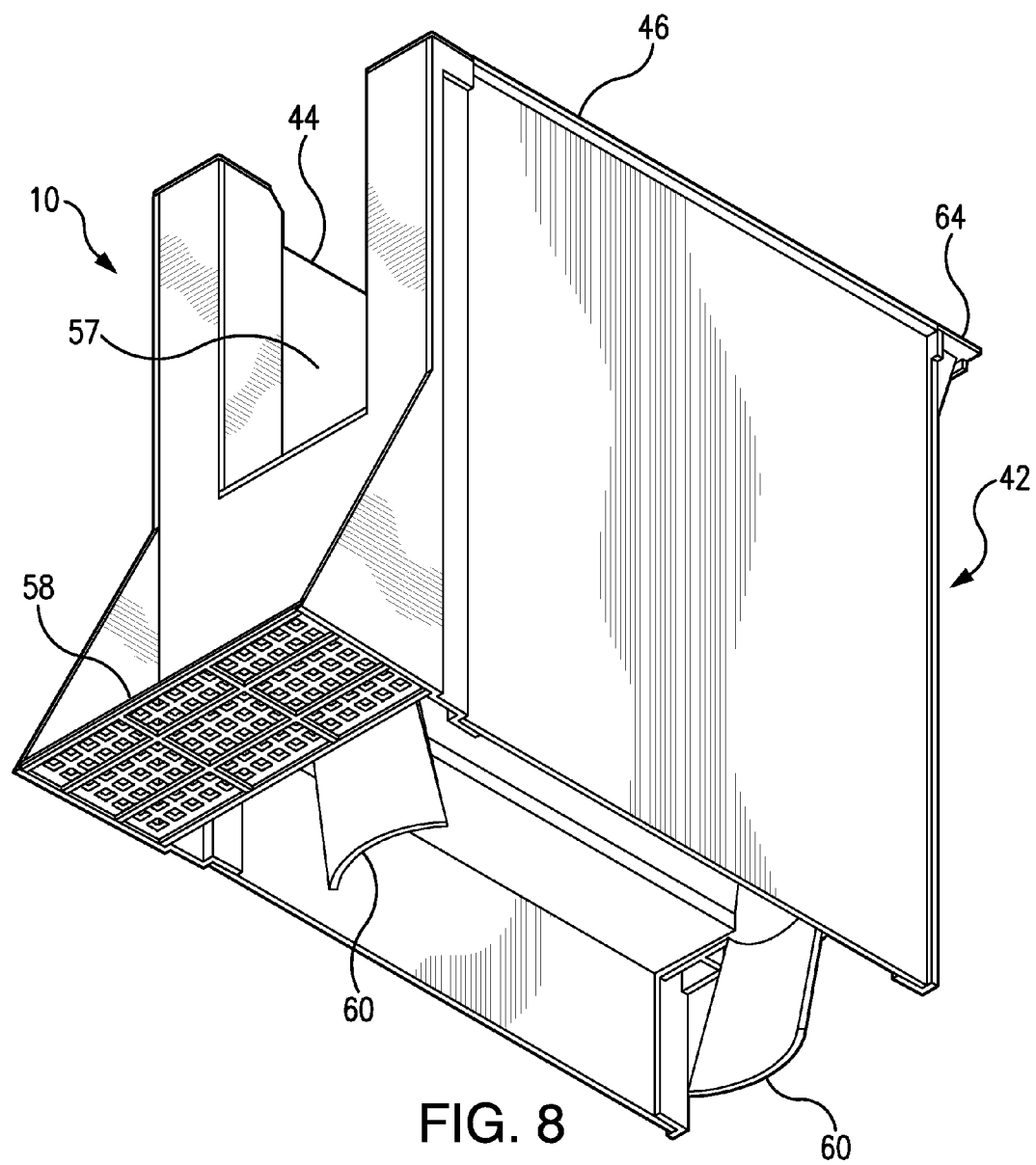
FIG. 8 is a bottom perspective view of the cat toilet device of the present invention according to the embodiment shown in FIG. 7.

This second embodiment of the cat toilet device 10 may also be used in combination with a support base 68 and removable trough 66 that slides into the support base 68. The support base 68 allows for the option of placing the cat toilet device 10 on a floor surface instead of a bathroom toilet. In this instance, the support structure 42 is seated on top of the support base 68 which rests on the floor surface. The removable trough 66 is sized and configured to slide into the support base 68, as seen in FIG. 7, so that the trough is positioned directed below the relief structure 50 and the open longitudinal gap 56 when the support structure 42 is seated on top of the support base 68. In use, the trough 66 can be easily pulled out from the support base 68 for cleaning. The trough 66 may be filled at least partially with cat litter, sand or sawdust. Alternatively, the trough 66 can be partially filled with water. When water is used in the trough 66, a few drops of oil can be placed on the top surface of the water to create a barrier that helps to prevent release of odors of the feces and urine from below the surface of the water.

Figure 11:
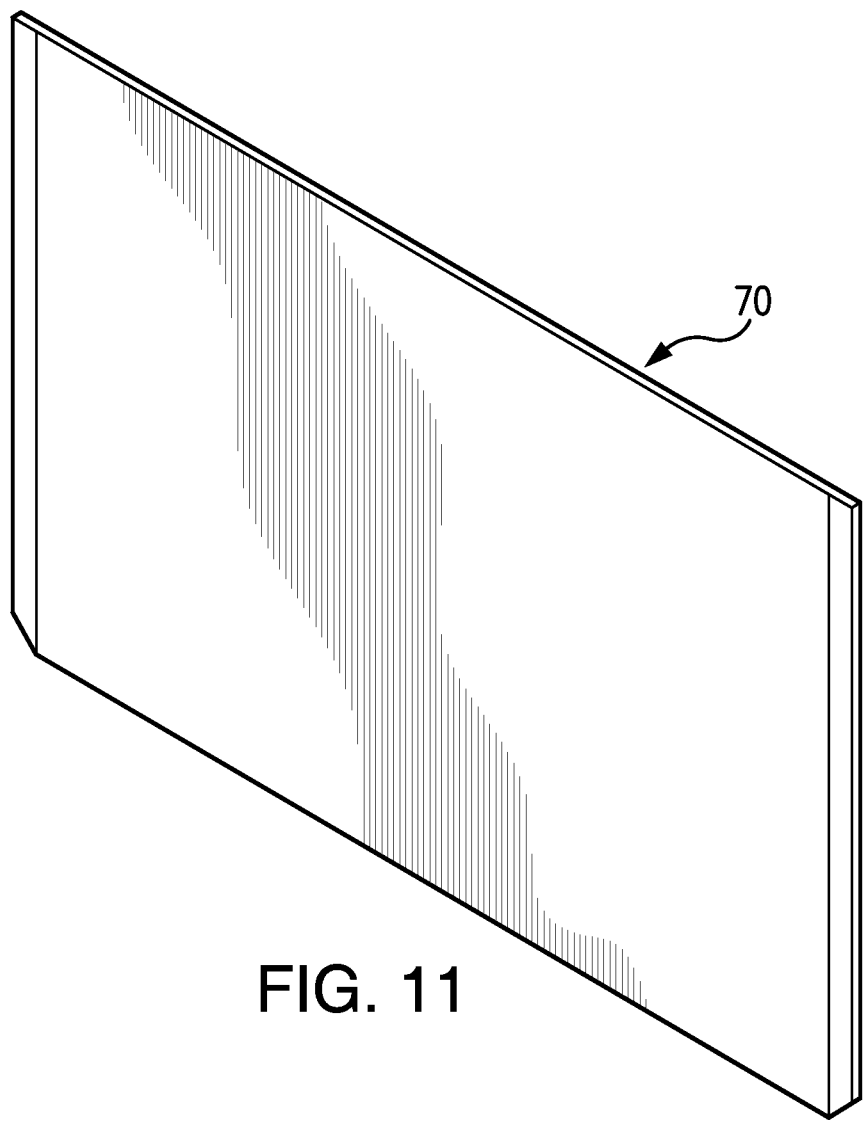
FIG. 11 is a perspective view of one shim which is part of a set of two shims for use in combination with the cat toilet device of the present invention.

Referring to FIG. 11, a single one of a pair of shims is shown. Each shim 70 is sized and configured for insertion into slots 29 on the inner facing surfaces of the vertically extending wall members 14, 16 of the first embodiment and 44, 46 of the second embodiment. When in place, the shims 70 serve to confine the cat in a more narrow space in order to more likely ensure that the cat will relieve itself in the open longitudinal gap 26 or 56. During the training process, the shims 70 are symmetrically repositioned on each side to gradually train the cat to be centered above the longitudinal gap 26 or 56 when relieving itself.

While the present invention has been shown and described in accordance with a preferred and practical embodiment thereof, it is recognized that departures from the instant disclosure are contemplated within the spirit and scope of the present invention.

What is claimed is:

1. A toilet device for cats comprising:
   a support structure having parallel, vertically extending wall members, a bottom chamber, and an elevated relief structure between the opposing wall members and above the bottom chamber;
   a pair of longitudinal channels on an upper side of the relief structure, including a first longitudinal channel and a second longitudinal channel, and said first and second longitudinal channels each being defined by an inner side of one of the vertically extending wall members, a channel floor and an inboard channel wall positioned in spaced, parallel relation to the inner side of the one of the vertically extending wall members, and the inboard channel wall extending upwardly from the channel floor and terminating at a top edge;
   an open longitudinal gap extending between the top edges of the inboard channel walls of the first and second longitudinal channels, and said open longitudinal gap being sized, structured and configured to permit passage of urine and feces from a cat standing on the relief structure with the left paws of the cat in one of the first or second longitudinal channels and the right paws of the cat in the other one of the first and second longitudinal channels so that the cat is straddling the inboard channel walls and the open longitudinal gap;
   a removable trough positionable in the bottom chamber for receiving and containing the urine and feces that passes through the open longitudinal gap; and
   wherein said support structure includes an arrangement of vertically extending parallel slots at opposite ends of the wall members for removable receipt of wall shims therein.

2. The device as recited in claim 1 wherein the support structure includes at least one entry at one end of the support structure for allowing a cat to enter between the wall members and onto the relief structure.

3. The device as recited in claim 2 wherein the support structure includes at least one step below the at least one entry.

4. The device as recited in claim 2 further comprising:
   a pair of the wall shims positionable between the wall members for narrowing a space between the wall members along a length of the relief structure, wherein the narrowed space assists a cat in being properly aligned over the open longitudinal gap when relieving itself.

5. The device as recited in claim 1 further comprising:
   at least one insert member adapted to be removeably inserted within the open longitudinal gap for reducing a transverse dimension of the open longitudinal gap.

6. The device as recited in claim 1 further comprising:
   at least one insert member adapted to be removeably inserted within the open longitudinal gap for completely closing the open longitudinal gap.

7. The device as recited in claim 1 wherein said support structure includes a base portion surrounding the bottom chamber, and said base portion being structured and disposed to rest on a floor surface or other flat surface and maintain the support structure in a vertically upright position.

8. The device as recited in claim 2 wherein the support structure includes an entry at opposite ends of the support structure for allowing a cat to enter between the wall members and onto the relief structure at either end of the support structure and to exit at the opposite end.

9. A toilet device for cats comprising:
   a support structure having parallel, vertically extending wall members, a bottom chamber, and an elevated relief structure between the opposing wall members and above the bottom chamber;
   a pair of longitudinal channels on an upper side of the relief structure, including a first longitudinal channel and a second longitudinal channel, and said first and second longitudinal channels each being defined by an inner side of one of the vertically extending wall members, a channel floor and an inboard channel wall positioned in spaced, parallel relation to the inner side of the one of the vertically extending wall members, and the inboard channel wall extending upwardly from the channel floor and terminating at a top edge; and
   an open longitudinal gap extending between the top edges of the inboard channel walls of the first and second longitudinal channels, and said open longitudinal gap being sized, structured and configured to permit passage of urine and feces from a cat standing on the relief structure with the left paws of the cat in one of the first or second longitudinal channels and the right paws of the cat in the other one of the first and second longitudinal channels so that the cat is straddling the inboard channel walls and the open longitudinal gap; and
   wherein said support structure includes an arrangement of vertically extending parallel slots at opposite ends of the wall members for removable receipt of wall shims therein.

10. The device as recited in claim 9 further comprising:
    a pair of the wall shims positionable between the wall members for narrowing a space between the wall members along a length of the relief structure, wherein the narrowed space assists a cat in being properly aligned over the open longitudinal gap when relieving itself.

11. The device as recited in claim 9 further comprising:
    at least one insert member adapted to be removeably inserted within the open longitudinal gap for reducing a transverse dimension of the open longitudinal gap.

12. The device as recited in claim 9 further comprising:
    at least one insert member adapted to be removeably inserted within the open longitudinal gap for completely closing the open longitudinal gap.

13. The device as recited in claim 9 further comprising:
    a trough removably positionable in the bottom chamber for receiving and containing the urine and feces that passes through the open longitudinal gap.

14. The device as recited in claim 9 wherein the support structure includes at least one entry at one end of the support structure for allowing a cat to enter between the wall members and onto the relief structure.

15. The device as recited in claim 14 wherein the support structure includes at least one step below the at least one entry.

* * * * *